(12) United States Patent
Hori et al.

(10) Patent No.: US 6,795,127 B1
(45) Date of Patent: Sep. 21, 2004

(54) VIDEO PROCESSING SYSTEM AND VIDEO PROCESSING METHOD

(75) Inventors: Osamu Hori, Kanagawa-ken (JP); Toshimitsu Kaneko, Kanagawa-ken (JP); Hisashi Aoki, Kanagawa-ken (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 09/266,611

(22) Filed: Mar. 11, 1999

(30) Foreign Application Priority Data

Mar. 12, 1998 (JP) .......................................... P10-061186

(51) Int. Cl.[7] ................................................. H04N 5/14
(52) U.S. Cl. ...................... 348/700; 348/700; 348/409; 382/232; 382/238; 375/240; 375/240.26
(58) Field of Search ................................ 348/700, 409, 348/384, 722, 390, 407, 699–701, 415–416, 410–413, 402, 155, 400, 154; 382/232, 238; 378/240, 240.29, 240.26

(56) References Cited

U.S. PATENT DOCUMENTS

| | | | | |
|---|---|---|---|---|
| 5,767,922 A | * | 6/1998 | Zabih et al. ................. | 348/700 |
| 5,767,923 A | * | 6/1998 | Coleman, Jr. ................ | 348/700 |
| 5,835,163 A | * | 11/1998 | Liou et al. ................... | 348/700 |
| 5,900,919 A | * | 5/1999 | Chen et al. .................. | 348/700 |
| 6,137,544 A | * | 10/2000 | Dimitrova et al. ........... | 348/700 |
| 6,415,000 B1 | * | 7/2002 | Hirzalla et al. ......... | 375/240.29 |

* cited by examiner

*Primary Examiner*—Chris Kelley
*Assistant Examiner*—Shawn S. An
(74) *Attorney, Agent, or Firm*—Foley & Lardner LLP

(57) ABSTRACT

A system which allows significant camera breaks to be automatically detected among a large number of camera breaks and which is suitable in retrieving or playing a digital video is realized. Using a detected result recorded in an analysis result recording unit, a camera break analyzing unit compares the camera breaks among different digital videos. Thereby, the camera break analyzing unit detects camera breaks in which similar frames are detected, like frames used in common among a plurality of digital video of the same category. Such camera breaks are detected as the significant camera breaks among the large number of camera breaks and are used as indexes for retrieving or playing the digital video.

47 Claims, 12 Drawing Sheets

ANALYSIS OF CAMERA BREAK

ANALYSIS OF CAMERA BREAK

VIDEO PROCESSING SYSTEM AND VIDEO PROCESSING METHOD

BACKGROUND

1. Field of the Invention

The present invention relates to a video processing system and a video processing method and more particularly to a video processing system and a video processing method for automatically putting an index into a video for retrieving or playing desired pictures.

2. Description of Related Art

Generally, a moving picture (a video) has an advantage that it can be accessed randomly to a desired position and a picture (frame) by recording it onto a CD-ROM, a CD-RW (ReWritable), a DVD (Digital Versatile Disk)-ROM and a DVD-RAM and the like, instead of recording onto media such as a magnetic tape from which a video can only be read in a sequential manner.

In order to access the desired positions and frames, it is necessary to insert indexes among the video. However, it takes too much time to put the indexes manually. With respect to marking the frames with the indexes automatically, there has been proposed a method of detecting locations called a 'camera break' (where a different picture appears) by comparing two frames temporally adjacent each other and putting in the index.

However, such camera breaks appear approximately every five seconds in videos such as TV broadcasting programs and movies in general. Therefore, there arises a problem that if indexes are inserted to all of the detected camera breaks, the number of indexes increases excessively and it takes time to retrieve or play the desired pictures, which is contrary to its purpose.

Accordingly, it is a purpose of the present invention to solve the above-mentioned problems by providing a video processing system and a video processing method which allow significant camera breaks to be specified among a large number of camera breaks and which are suitable for retrieving and playing the videos.

SUMMARY OF THE INVENTION

The present invention solves the above problems. In order to solve the above-mentioned problems, the present invention provides a video processing system for determining a desired camera break in a video, including a detecting unit for detecting at least one camera break in the video, and an analyzing unit communicatively coupled to the detecting unit, wherein the analyzing unit analyzes a level of similarity between the detected camera break and a reference frame, and wherein the analyzing unit determines that the detected camera break is a desired camera break if the level of similarity is equal to or greater than a predetermined level.

According to a preferred embodiment of the present invention, the reference frame may be obtained from a different video. Both the video and the different video may belong to a same category. The video may be a digital video.

In the system, the predetermined level may require that the reference frame and the detected camera break be identical.

In the system, the detecting unit may detect a plurality of successive camera breaks, wherein the analyzing unit may analyze a level of similarity between the plurality of detected successive camera breaks and a plurality of reference frames, and wherein the analyzing unit may determine that the detected successive camera breaks are desired camera breaks if the level of similarity is equal to or greater than a predetermined level.

The system may further includes a recording unit for recording information concerning the desired camera break. The recorded information may include an index correspondence relationship between the desired camera break and the reference frame.

The system may further includes a processing unit for processing the video using the recorded information. The processing unit may retrieve the desired camera break from the video. The processing unit may play section in the video, wherein the section includes the desired camera break.

The system may further includes an other analyzing unit electrically connected to the recording unit, wherein the other analyzing unit may analyze a level of similarity between an other detected camera break and the desired camera break stored in the recording unit, and wherein the other analyzing unit may determine that the other detected camera break is an other desired camera break if the level of similarity is equal to or greater than an other predetermined level. Here, the predetermined level may require that the reference frame and the detected camera break be identical.

The system may further includes an other recording unit for recording information on the other desired camera break. The recorded information may include an index correspondence relationship between the desired camera break and the other desired camera break. The index correspondence relationship may include information on a frame number of the desired camera break and the other desired camera break.

The video processing system may determine a desired camera break among a plurality of videos, wherein the detecting unit may detect at least one camera break in each of the plurality of videos, wherein the analyzing unit may determine a number of videos among the plurality of videos in which the detected camera break of one of the videos has a level of similarity to the other detected camera breaks of the other videos equal to or greater than a predetermined level, and wherein the analyzing unit may determine that the detected camera break of the one video is a desired camera break if the number of videos is greater than a predetermined value.

The present invention also provides a video processing method for determining a desired camera break in a video, including steps of detecting at least one camera break in the video, analyzing a level of similarity between the detected camera break and a reference frame, and determining that the detected camera break is a desired camera break if the level of similarity is equal to or greater than a predetermined level.

According to a preferred embodiment of the present invention, the reference frame may be obtained from a different video. Both the video and the different video may belong to a same category. The video may be a digital video.

In the method, the predetermined level may require that the reference frame and the detected camera break be identical.

In the method, the detecting step may detect a plurality of successive camera breaks, wherein the analyzing step may analyze a level of similarity between the plurality of detected successive camera breaks and a plurality of reference frames, and wherein the analyzing step may determine that the detected successive camera breaks are desired camera breaks if the level of similarity is equal to or greater than a predetermined level.

The method may further includes a recording step that records information concerning the desired camera break. The recorded information may include an index correspondence relationship between the desired camera break and the reference frame.

The method may further includes a processing step that process the video using the recorded information. The processing unit may retrieve the desired camera break from the video. The processing unit may play section in the video, wherein the section includes the desired camera break.

The method may further includes an other analyzing step that may analyze a level of similarity between an other detected camera break and the desired camera break stored in the recording unit, and wherein the other analyzing step may determine that the other detected camera break is an other desired camera break if the level of similarity is equal to or greater than an other predetermined level. Here, the predetermined level may require that the reference frame and the detected camera break be identical.

The method may further includes an other recording step that records information on the other desired camera break. The recorded information may include an index correspondence relationship between the desired camera break and the other desired camera break. The index correspondence relationship may include information on a frame number of the desired camera break and the other desired camera break.

The video processing method may determine a desired camera break among a plurality of videos, wherein the detecting step may detect at least one camera break in each of the plurality of videos, wherein the analyzing step may determine a number of videos among the plurality of videos in which the detected camera break of one of the videos has a level of similarity to the other detected camera breaks of the other videos equal to or greater than a predetermined level, and wherein the analyzing step may determine that the detected camera break of the one video is a desired camera break if the number of videos is greater than a predetermined value.

The present invention further provides a recording medium on which a video processing program is stored for determining a desired camera break in a video, the video processing program being for causing a computer to execute steps of detecting a camera break in the video, analyzing a level of similarity between the detected camera break and a reference frame, and determining that the detected camera break is a desired camera break if the level of similarity is equal to or greater than a predetermined level.

The present invention yet provides a video processing system for determining a desired camera break in a video, including a detecting unit for detecting at least one camera break in the video, and an analyzing unit communicatively coupled to the detecting unit, wherein the analyzing unit analyzes a level of similarity between the detected camera break and a reference frame, and wherein the analyzing unit determines that the detected camera break is a desired camera break if the detected camera break and the reference frame are similar.

DESCRIPTION OF PREFERRED EMBODIMENTS

An embodiment of a video processing system and a video processing method of the present invention will now be described in more detail with reference to the accompanying drawings.

Figure 1:
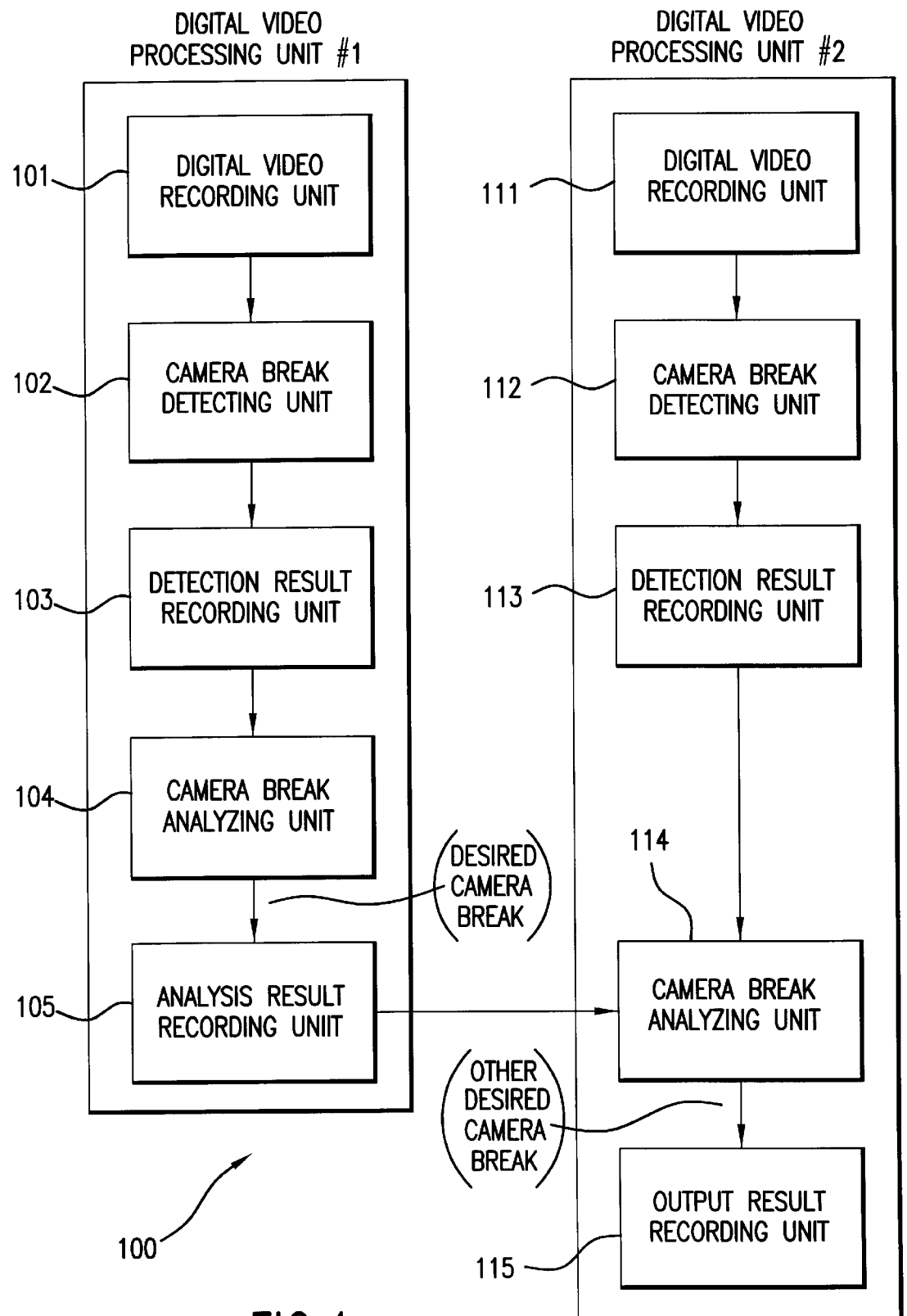
FIG. 1 is a block diagram showing the system structure of a video processing system according to one embodiment of the present invention.

FIG. 1 shows the system structure of a video processing system 100 according to an embodiment of the present invention. This system is arranged so as to record digital moving pictures (digital video) onto a randomly accessible recording medium (a CD-ROM, a CD-RW, a DVD-ROM and a DVD-RAM, etc.), and to retrieve or play pictures of the digital video by using the recording medium, and performs a function of analyzing videos. The system analyzes 'camera breaks' among a large number of frames of a video by comparing a plurality of videos of the same category. Thereby, the system can automatically mark the frames with a significant index and can retrieve specific frames, or play the video with skipping the specific frames. Note that the present invention is not limited to retrieve or play only the digital videos, but also applicable to analogue videos.

As shown in FIG. 1, a digital video processing unit #1 of the video processing system includes a digital video recording unit 101, a camera break detecting unit 102, a detection result recording unit 103, a camera break analyzing unit 104 and an analysis result recording unit 105.

The digital video recording unit 101 records a plurality of digital videos and is realized by using randomly accessible recording media as explained above. The recording media may be a hard disk, a videotape or a semiconductor memory.

In the present embodiment, a plurality of digital videos of the same category are recorded in the digital video recording unit 101, and indexes for retrieving or playing such digital videos are created by sampling a feature common to those digital videos. Here, the digital videos of the same category mean those videos that contain at least containing one identical common frame, e.g., a group of recorded videos of a specific type of TV news program that is broadcast every day at 7 A.M., a group of recorded videos of a specific type of TV variety show program that is broadcast once a week, and the like. In these TV programs, common video sources are often used at the beginning and at the ending of each program. Specifically, the variety show program is often composed of several sub-programs and the common video source is used in the opening of each sub-program.

The camera break detecting unit 102 detects camera breaks by taking out the digital videos one by one from the digital video recording unit 101 and compares frames temporally adjacent each other within the digital videos. In this case, although adjacent frames within one scene have high temporal correlation and are similar each other, the frames largely change before and after the camera break and there is almost no correlation between the frames. The camera break is detected based on such non-similarity between frames that are temporally adjacent to one another.

In specific, a method disclosed in Japanese Patent Publication (Kokoku) No. 05-074273, for example, may be used in detecting the camera break (cut).

According to this method, the camera break is detected by calculating, for example, a change of luminance and a change of frequency of color per frame statistically in a recorded frame sequence, and by sampling the relative changes. The camera breaks include one type of break in which the frame is changed instantly another type of break in which the frame is changed gradually by a fade-in and fade-out technique called a 'resolve'. In case of the resolve, a frame just after when the scene has been changed completely is detected. The resolve may be detected by the method introduced in Yukinobu Taniguchi, Yoshinobu Tomura and Hiroshi Hamada, "A method for detecting shot changes and its application to access interfaces to video", The Transactions of the Institute of Electronics, Information and Communication for Engineers D-II, Vol. J79-D-II, No. 4, pp.538–546, 1996, April, for example.

The camera breaks of each digital video detected by the camera break detecting unit 102 are recorded in the detection result recording unit 103. Information recorded therein is the sequential numbers of the detected frames. The corresponding frames of the recorded sequential numbers may be also recorded therein together. The recording media may be a hard disk, a DVD-RAM, a videotape or a semiconductor memory. The digital video recording unit 101 may also be used as the recording unit 103 in common.

Using the detection result recorded in the detection result recording unit 103, the camera break analyzing unit 104 compares the frames of the camera breaks among different digital videos to calculate a frequency of the appearance of sufficiently similar frames, i.e., frames that have a level of similarity of at least a predetermined level, from the digital videos. Thereby, it detects the position of the camera break of the similar frames detected frequently from the other digital videos, such as a frame used in common in a plurality of digital videos of the same category.

The analysis result of the camera break analyzing unit 104 is recorded in the analysis result recording unit 105 and is used as an index for retrieving or playing the digital video on the digital video recording unit 101. The information stored in the analysis result recording unit 105 is also utilized as template frames to be used as comparative images in newly processing further digital videos of the same category. The digital video recording unit 101 may also be used as the analysis result recording unit 105 in common.

As described above, the significant camera break corresponding to the point of change of the program structure can be detected among a large number of camera breaks by analyzing the camera breaks using the digital video processing unit #1.

A digital video processing unit #2 in FIG. 1 performs an image analyzing process on a new digital video by using the contents of the analysis result recording unit 105 of the digital video processing unit #1 when another new digital video of the same category is to be newly processed.

That is, the digital video processing unit #2 takes out the new digital video to be processed from a digital video recording unit 111 and detects a camera break by a camera break detecting unit 112 by comparing the temporally adjacent frames. A sequential number of the detected camera break is recorded in a detection result recording unit 113. A camera break analyzing unit 114 compares frames of each camera break of the new digital videos to be processed with the template frames stored in the analysis result recording unit 105 to determine whether or not they are sufficiently similar. The sequential numbers of the frames similar to the template frames are recorded in an output result recording unit 115 as indexes of the new digital videos to be processed.

It is noted that the digital video recording unit 111, the camera break detecting unit 112 and the detection result recording unit 113 of the digital video processing unit #2 have the same functions as the digital video recording unit 101, the camera break detecting unit 102 and the detection result recording unit 103 of the digital video processing unit #1, respectively. Therefore, the digital video processing unit

1 and the digital video processing unit #2 may be realized as independent systems or as a common system. When they are realized as a common system, the units performing the same function may be shared among the digital video processing units #1 and #2.

Figure 2:
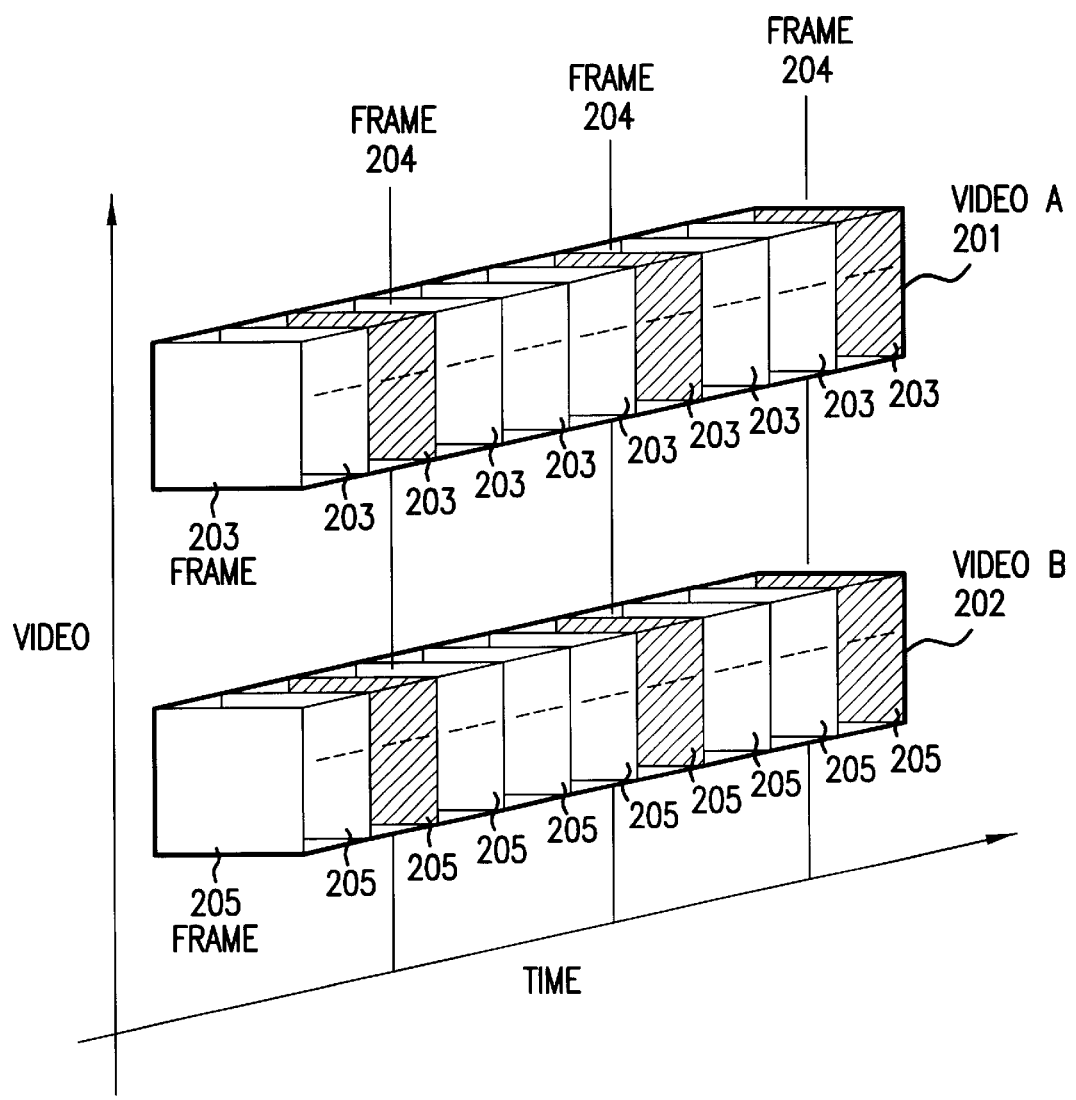
FIG. 2 is a first diagram for explaining one way of analyzing camera breaks among frames according to the embodiment.
Figure 3:
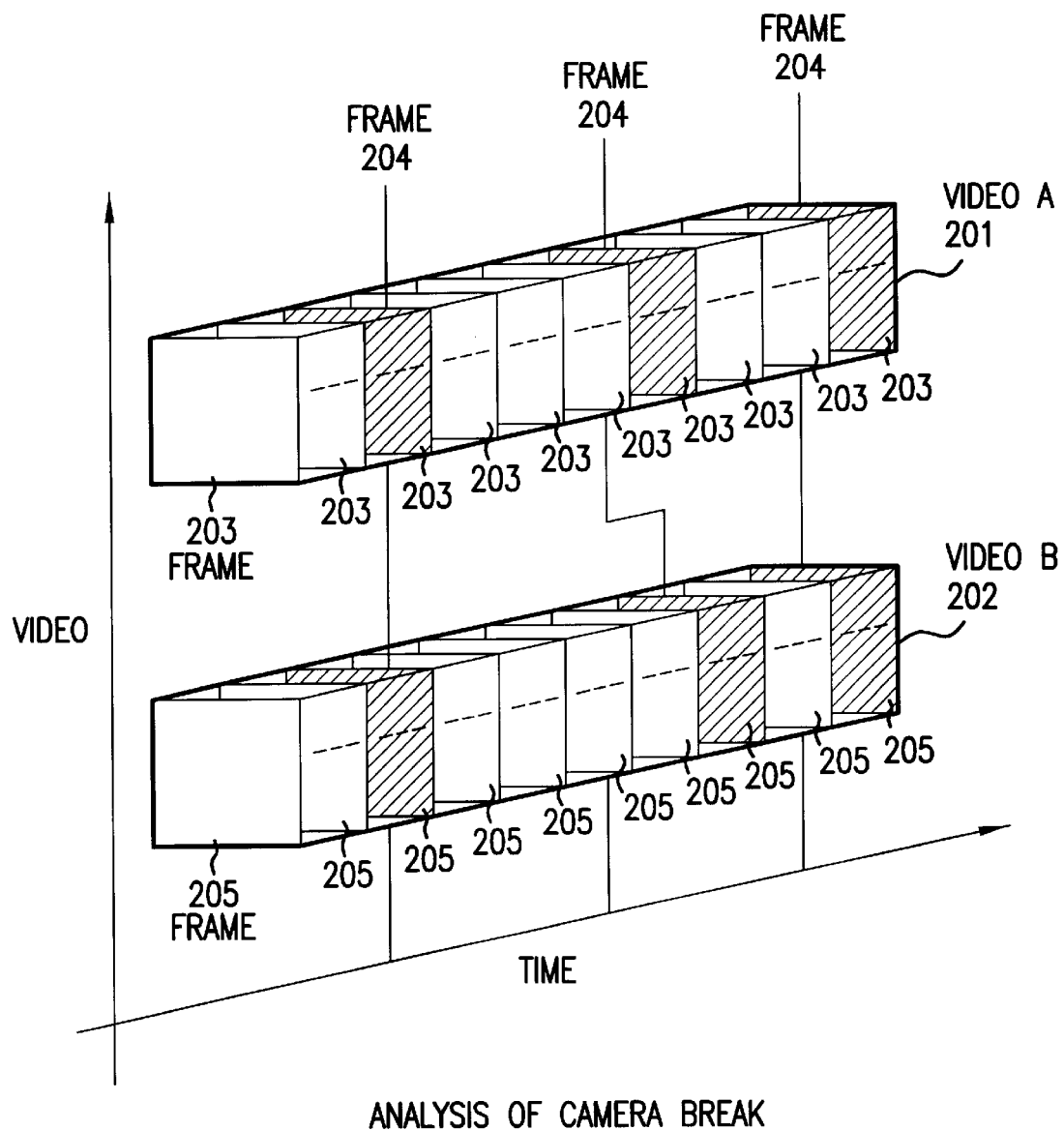
FIG. 3 is a second diagram for explaining one way of analyzing the camera breaks among the frames according to the embodiment.

Next, the process performed by the camera break analyzing unit 104 will be explained by using conceptual diagrams in FIGS. 2 and 3.

Here, videos of the same category are processed as videos 201 and 202 of the same category, such as a news program broadcast every day at 7 A.M., or a variety show program put on the air once a week, for example. As these videos are in the same category, the length thereof is basically the same. However, because the camera break analyzing unit 104 can set a specific range to be processed, the length of the videos to be processed needs not always be the same. Frames 203 and 205 of the respective camera breaks detected by the camera break detecting process are detected at many locations within the sequence of the videos in both of the videos 201 and 202. Normally, the camera breaks are detected approximately every five seconds.

As described before, the frames 204 are of the same image and used regularly, i.e., title frame pictures of the opening and each sub-program, will exist within the videos of the same category. In many cases, the same frames appear almost at the same time along the time direction. FIG. 2 shows a case when the same frames appear at the same time, and FIG. 3 shows a case when the same frames appear at temporally different frame positions.

As for sub-programs which start at fixed times within a program, it may be processed by limiting a time width to be analyzed. In other variety show programs, a sub-program is set irregularly, no sub-program is set or the sub-program is set with a considerable temporal deviation. In such a case, the system checks whether or not the same frames 204 exist in the other digital videos by checking all combinations when there is no knowledge about it in advance.

Next, the procedure for analyzing digital videos will be explained with reference to FIG. 4. Here, suppose a case when five digital videos "NO. 1" through "NO. 5" are recorded in the digital video recording unit 101 as shown in FIG. 5. These five digital videos "NO. 1" through "NO. 5" are moving pictures of the same news program broadcast at different dates.

At first, after detecting camera breaks in these five digital videos, the camera breaks are analyzed by the following procedure.

That is, it is first determined whether or not an unprocessed camera break exists in one digital video to be processed (suppose the video NO. 1 here) in Step 301. When an unprocessed camera break exists, it is compared respectively with camera breaks obtained from the other videos NO. 2 through NO. 4 of the same category in Step 302. When it is determined that the camera break within the video NO. 1 is sufficiently similar, such as identical, with one camera break contained in any one of the other camera breaks NO. 2 through NO. 4 in Step 302, the index correspondence relationship between these camera breaks within the videos is recorded in Step 303.

Successively, the process returns to Step 301 to determine whether or not another unprocessed camera break exists.

When there are no more unprocessed camera breaks, the process advances to Step 304 to count a number of the same frames existing in the other videos with respect to each of the camera breaks of the digital video to be processed. Next, a camera break that occurs more than a certain threshold value of occurrences among the digital videos is detected as a similar frame among the camera breaks within the digital video to be processed in Step 305. Then, this detected result is recorded in the recording unit as an index in Step 306.

Because the common source images are used at the opening program and the weather forecast program in the example in FIG. 5, it is detected that among camera breaks A1 through A8 detected from the digital video NO. 1, the camera break A3 is the same frame with a camera break B3 within the digital video NO. 2, as well as a camera break C4 in the digital video NO. 3 and a camera break D4 in the digital video NO. 4. Accordingly, the picture of the camera break A3 is determined to have a similarity with other videos of the same category with a high frequency. Similar to that, it is detected that the camera break A8 within the digital video NO. 1 is the same frame with camera breaks B8, C9 and D10 in the other digital videos, and the picture of the camera break A8 is determined to have a similarity with high frequency.

In this case, among the camera breaks within the digital video NO. 1 to be processed, the camera breaks A3 and A8 are selected as significant camera breaks (i.e., desired camera breaks) and their positions are used as indexes for retrieving or playing the videos.

It is also possible to generate indexes as shown in FIG. 6 in Step 306.

FIG. 6 shows two indexes (INDEX 1, INDEX 2) corresponding to detected two similar frames. INDEX 1 indicates the digital videos and frame numbers where the common opening title of a program exists, and INDEX 2 indicates the digital videos and frame numbers where the title of the weather forecast exists.

It becomes possible to retrieve or play only the weather forecast program from the plurality of digital videos one after another, for example, by creating the indexes which can be used in common among the plurality of digital videos as shown in FIG. 6.

Next, with reference to the flowchart in FIG. 7, a process for using the analysis result obtained through the process shown in FIG. 4 (the camera break obtained through the process in FIG. 4 will be referred to as a 'template frame' hereinafter) to detect an identical camera break with the template frame out of a digital video of the same category which is to be newly processed will be explained.

Figure 8:
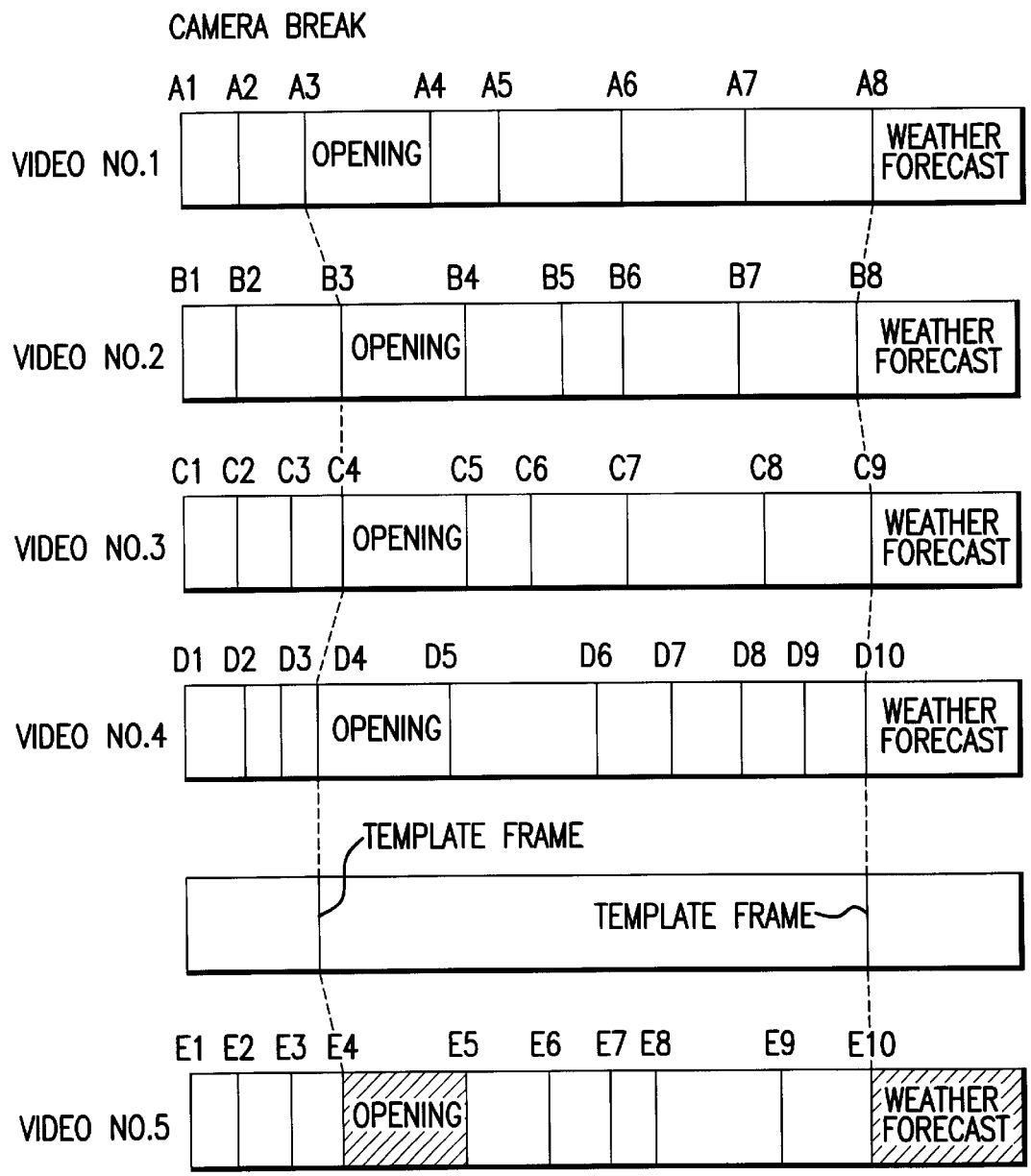
FIG. 8 is a diagram showing one way of analyzing the new videos of the same category in the embodiment.

Here, FIG. 8 shows a case of analyzing a new video NO. 5 of the same category by using the analysis result of the videos NO. 1 through NO. 4 which have been already analyzed.

At first, it is determined whether or not an unprocessed camera break frame exists in Step 401. When an unprocessed camera break exists, the camera breaks obtained from the video NO. 5 to be newly processed is compared to the template frame in Step 402. When it is determined that the camera break and the template frame are the same (identical) frame, the correspondence relationship between these frames is recorded in Step 403. Then, the process returns to Step 401 to either continue the process in Step 402 when there exists an unprocessed template frame, or to record the analysis result in Step 404 when no more unprocessed template frames exist.

In the case of FIG. 8, two camera breaks E4 and E10 which are the same frames as the template frames among the camera breaks in the new video NO. 5 are selected as significant camera breaks. This is done by taking out the template frames one by one and by comparing them with the camera breaks obtained from the new video NO. 5. Their positions are used as indexes for retrieving or playing the video NO. 5.

It is also possible to add information "Video NO. 5, Frame E4" to the INDEX 1 in FIG. 6 and also "Video NO. 5, Frame E10" to the INDEX 2. Thereby, the indexes common to the five digital videos are generated. Further, in the case when a user sets in advance a certain title, e.g., 'Opening', 'Weather Forecast', etc., indicative of that picture of the template frame, it is possible to realize controls such that the brief program structure is displayed on a screen per each digital video by using an icon or the like with a sub-program name ('Opening', 'Weather Forecast', etc.) or a corresponding video is automatically played by clicking the icon by linking the icon with the corresponding video in advance.

Figure 4:
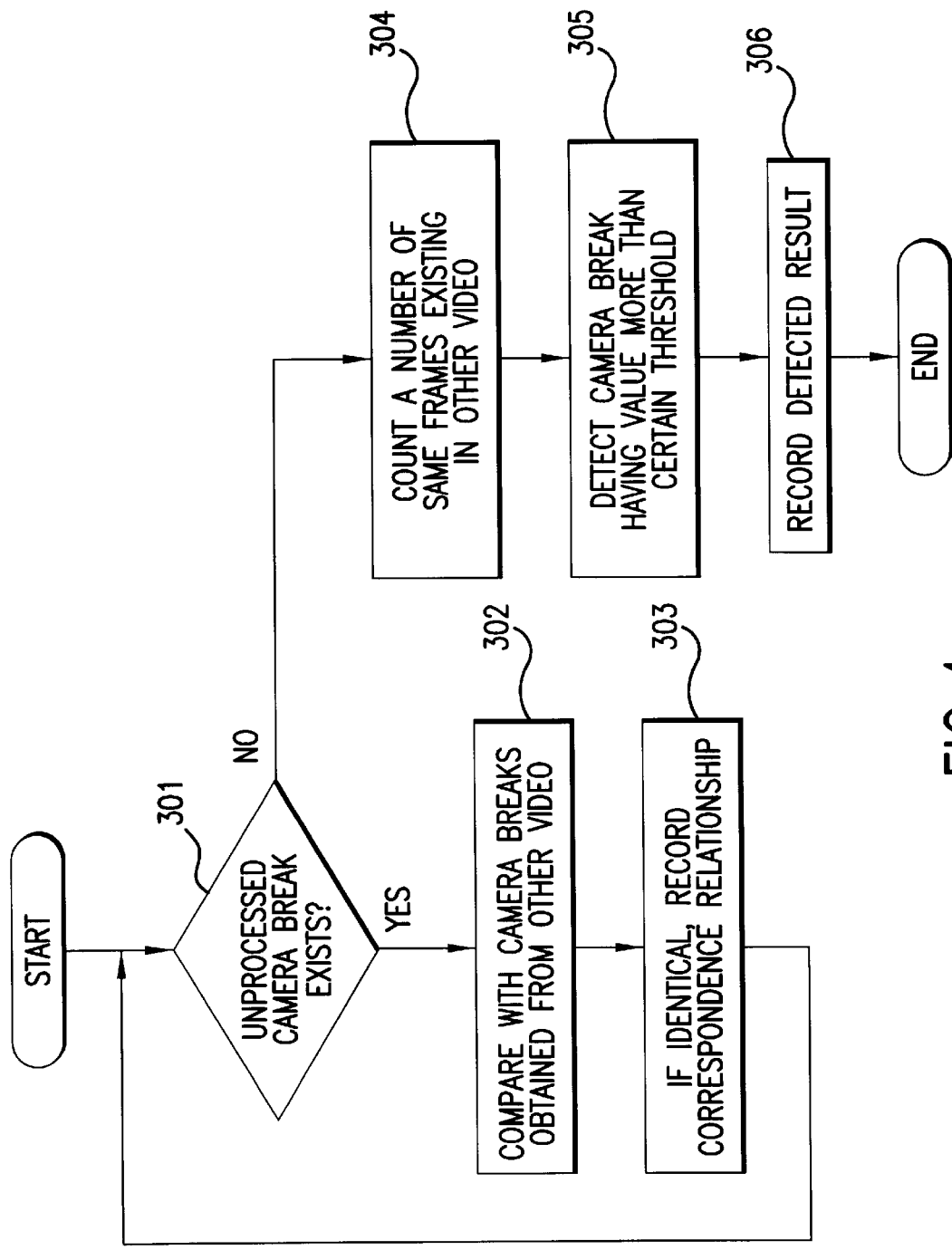
FIG. 4 is a flowchart showing the procedure of one way of analyzing the camera breaks among the frames according to the embodiment.
Figures 5, 6:
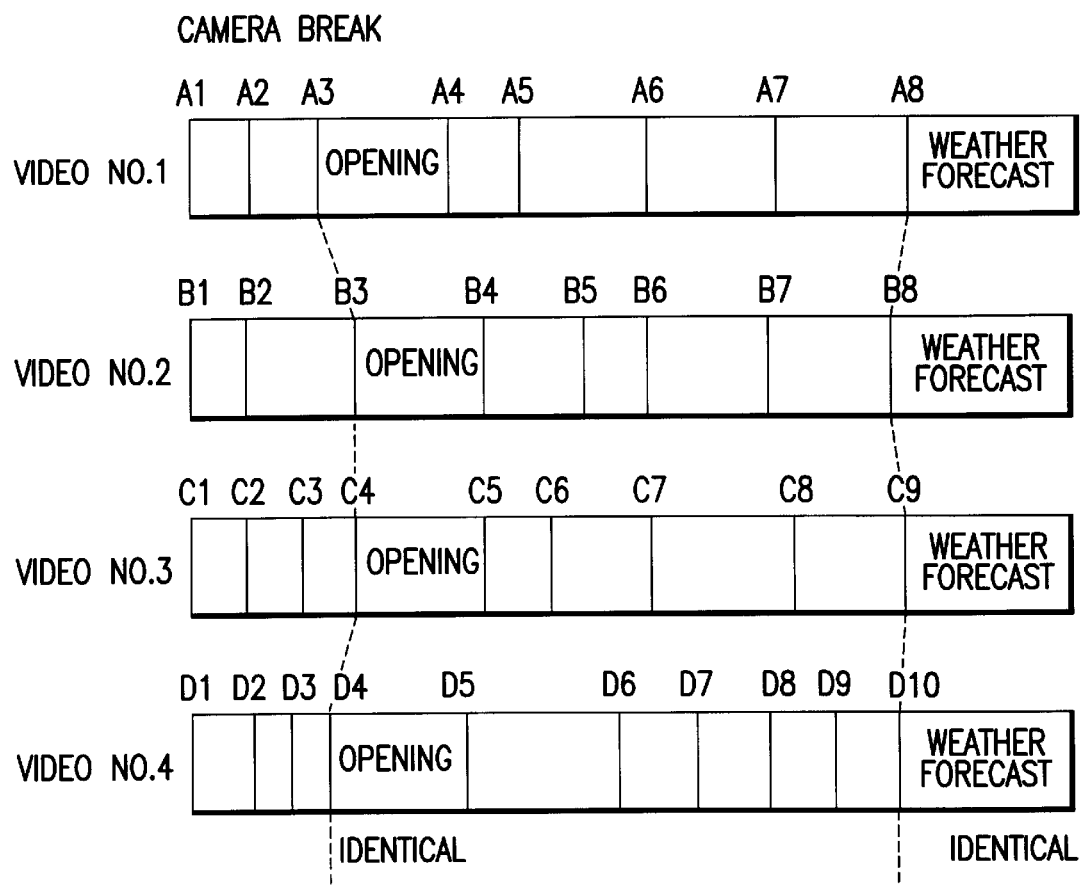
FIG. 5 is a diagram showing an example of a correspondence relationship of the frames of a plurality of videos according to the embodiment.
FIG. 6 is an example showing index information obtained through the analysis of the camera breaks in the embodiment.
Figure 7:
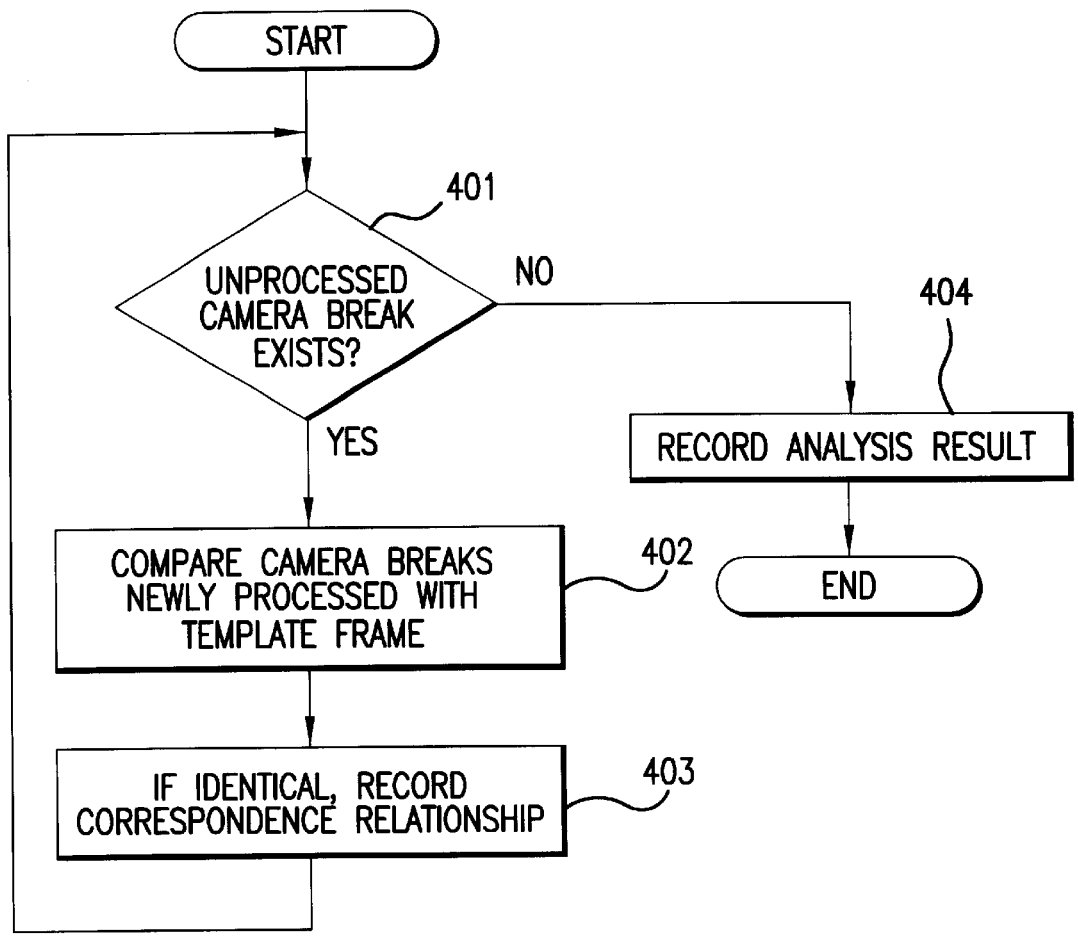
FIG. 7 is a flowchart showing a procedure of a process for analyzing a new video of the same category by using camera breaks already detected in the embodiment.

It is noted that although the resultant template frames detected in the process in FIG. 4 are used in the process in FIG. 7, the template frames may be provided manually in advance.

Further, it is not necessary to compare all camera breaks within a video and the range of the search may be limited. For instance, when a camera break to be detected is generally set in a certain time slot of the video, the processing time may be shortened and the detecting accuracy may be improved by applying the comparison only to that time slot.

As for the method for comparing the camera breaks in general, a method of considering the camera breaks is necessary to determine whether or not they are considered or deemed to be identical. One approach that may be applied is when an absolute sum of differences of RGB values of each image between the frames is less than a certain threshold value. However, because it takes time to obtain differences of all pixels, it is possible to use a method of comparing frames roughly by using a small number of pixels randomly selected from the frames to remove those that are apparently different and to select frames to be further compared, and then determining whether or not they are the identical frames by comparing the whole pixels precisely at this point in time. Thereby, the processing speed may be higher.

Figure 9:
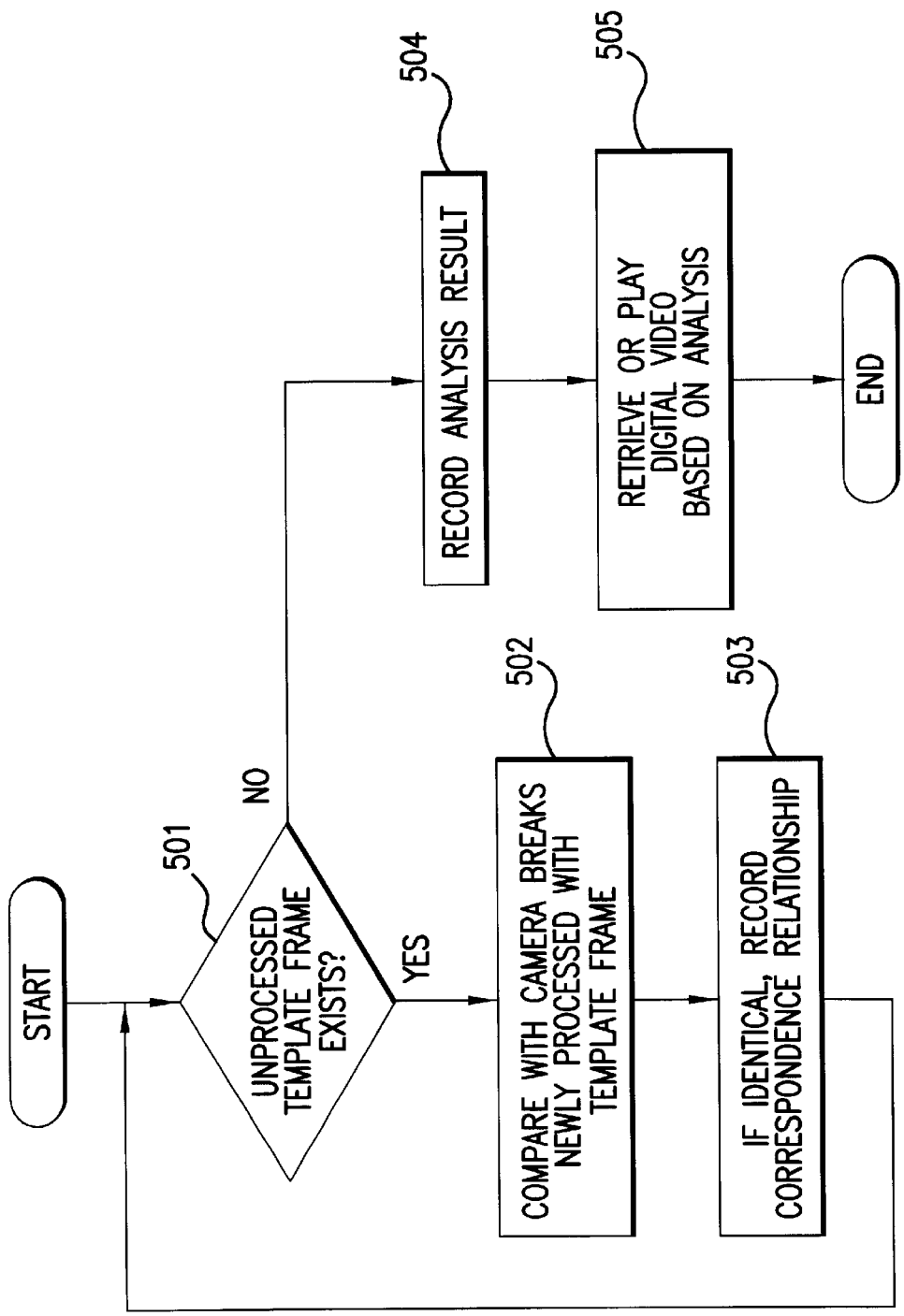
FIG. 9 is a flowchart showing a procedure of retrieving or playing a video by using the result of the analysis of the camera breaks of the embodiment.

FIG. 9 shows a procedure for retrieving or playing the video by using the analysis result of FIG. 7.

That is, at first in Step 501, it is determined whether or not an unprocessed template frame exists among the template frames, which template frames are given through the process in FIG. 4 or through the manual operation. When an unprocessed template frame exists, the template frame is compared with respective camera breaks obtained from the video to be retrieved or played in Step 502. When it is determined to be the same frame, their correspondence relationship is recorded in Step 503. Then, the process returns to Step 501 to continue the process in Step 502 when there exists an unprocessed template frame, or otherwise to record the analysis result in Step 504. Then, based on this analysis result, the digital video is retrieved or played.

In a type of news program through which current news is broadcast bit by bit together with old news, for example, there is a strong request for only variant news, that is, news different from news already seen. In this case, only the newly added news may be viewed by using the already viewed news program as a reference video, by sampling camera breaks from the viewed news program, by detecting similar frames from the new news by utilizing the camera breaks as the aforementioned template frames and by generating and playing the new digital video so as to omit the portion where the similar frame exists.

Figure 10:
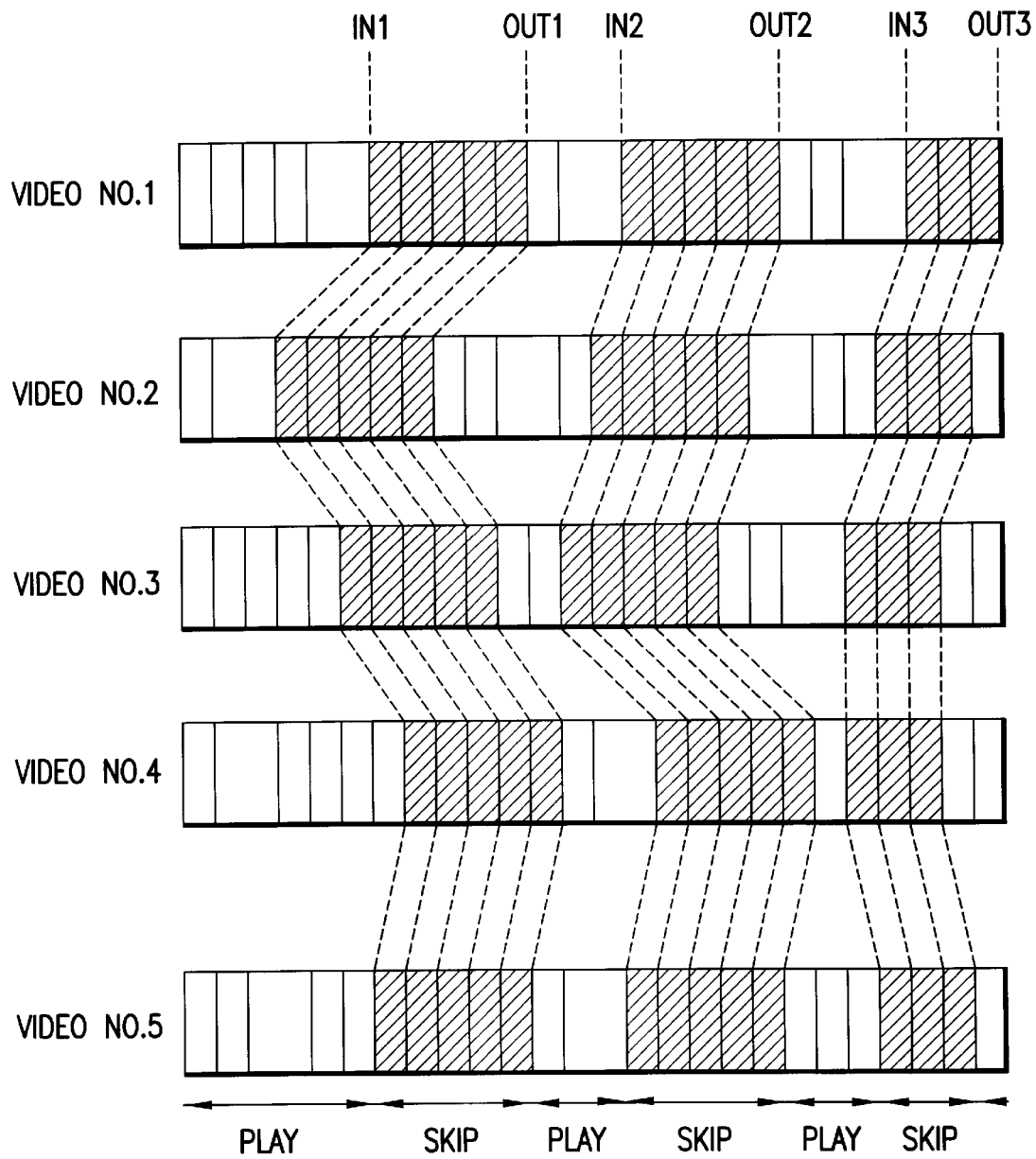
FIG. 10 is a diagram showing a way of detecting through a video similar frame sections by using the analysis of the camera breaks in the embodiment.

FIG. 10 shows a case of detecting the similar frames and of retrieving or playing the video by using the same.

Figure 11:
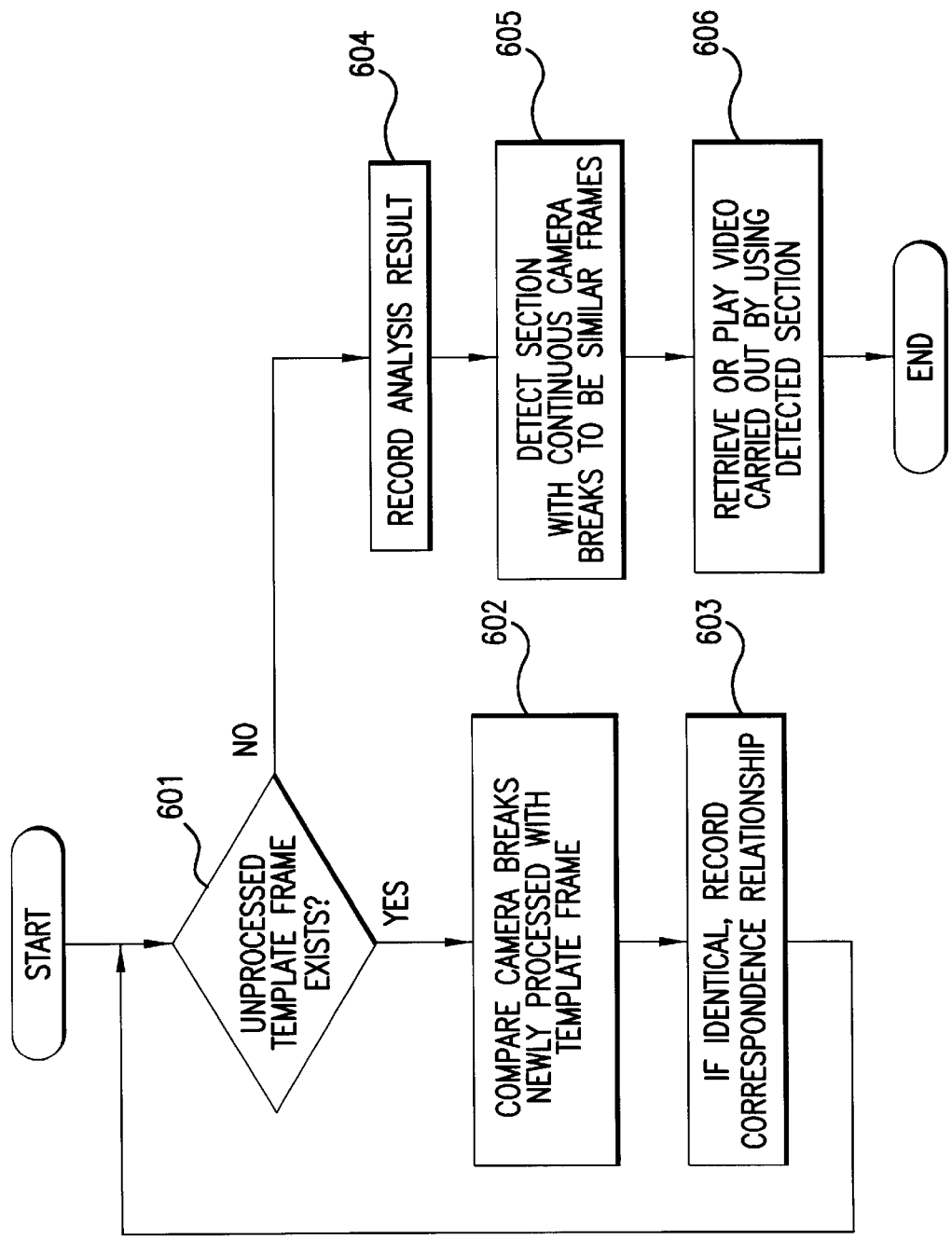
FIG. 11 is a flowchart showing a procedure of retrieving or playing a video by utilizing the process for detecting throughout a video similar frames by using the analysis of the camera breaks of the embodiment.

In FIG. 10, in case when the Video NO. 1 is a program already viewed and the Video NO. 2 is a program to be newly viewed, particular sections IN1 through OUT1, IN2 through OUT2 and IN3 through OUT3, where similar frames appear successively among the Video NO. 1 and the Video NO. 2, are detected. Video NO. 2 is retrieved or played by skipping those sections. FIG. 11 shows a processing procedure of this method.

That is, all camera breaks of the Video NO. 1 are used as template frames to compare with respective camera breaks of the Video NO. 2 sequentially and the correspondence relationship of the frames detected to be similar frames is recorded (Steps 601 through 603 of FIG. 11). Then, sections of the continuous or successive camera breaks within the Video NO. 2 detected to be the similar frames through the analysis of the recorded result in Step 602 are detected in Step 605. The control for retrieving or playing the Video NO. 2 is carried out by using the detected sections in Step 606.

Similarly, in case when the Video NO. 4 is an already viewed program and the Video NO. 5 is a program to be newly viewed, sections where similar frames appear continuously in the Video NO. 4 and the Video NO. 5 are detected, and the Video NO. 5 is retrieved or played by skipping those sections.

On the other hand, it is also possible to retrieve the identical frames. In the example in FIG. 10, a region containing a large number of same frames continuously may be specified by using the camera breaks of the section IN1 through OUT1 of the Video NO. 1 sequentially as template frames to compare with respective camera breaks of the other Videos NO. 2 through NO. 5 to detect the position of the same frames.

Accordingly, a digital video similar to or the same as a certain digital video may be found from a database in which a large number of digital videos are stored by comparing a camera break detected from a reference digital video with camera breaks of the large number of digital videos, and by retrieving or playing a digital video containing a large number of similar frames.

As described above, the present invention makes it possible to allows a significant camera break corresponding to a point of change in the structure of a whole program to be used as an index among a large number of camera breaks by recording the frame position of the camera break where a similar frame has been detected frequently. The present invention allows the program to be retrieved or played readily by categorizing the program into sub-programs and the like. Further, because the camera breaks are compared with each other, a processing amount may be reduced considerably as compared to the case of comparing all frames of the videos. Accordingly, the significant camera breaks may be detected through the process carried out by software by using a general-purpose computer, without using dedicated hardware. Therefore, all of the processes in FIGS. 4, 7, 9 and 11 may be realized by a computer program and the same effect with the present embodiment may be obtained by executing the program on a computer, where the program may be introduced to the computer through a recording medium such as a floppy disk or a CD-ROM.

Figure 12:
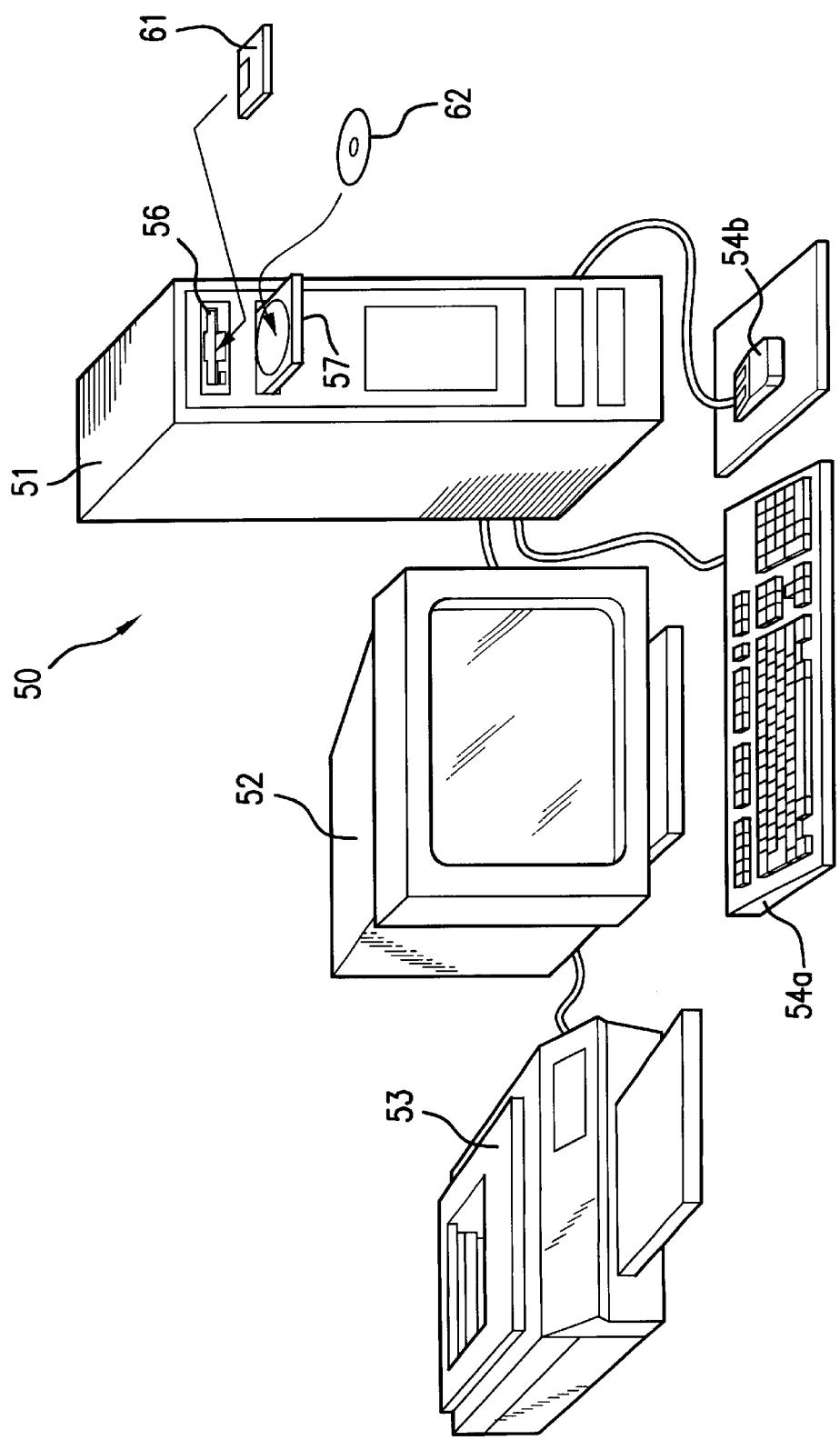
FIG. 12 is a perspective view of a computer system for reading out a video processing program from a recording medium according to an embodiment of the present invention.

A recording medium according to the present invention on which a video processing program is recorded will be described with reference to FIGS. 12 and 13. A recording medium according to the present invention on which the video processing program is recorded is read out by a recording medium driving device that is provided in a computer system as shown in FIG. 12, and used for video processing in a video processing system. As shown in FIG. 12, the computer system 50 has a computer main body 51 that is accommodated in a chassis such as a mini-tower, a display device 52 such as a CRT (cathode-ray tube), a plasma display, or a LCD (liquid crystal display), a printer 53 as a record output device, a keyboard and a mouse as input devices, a floppy disk drive 56, and an optical disk drive 57.

Figure 13:
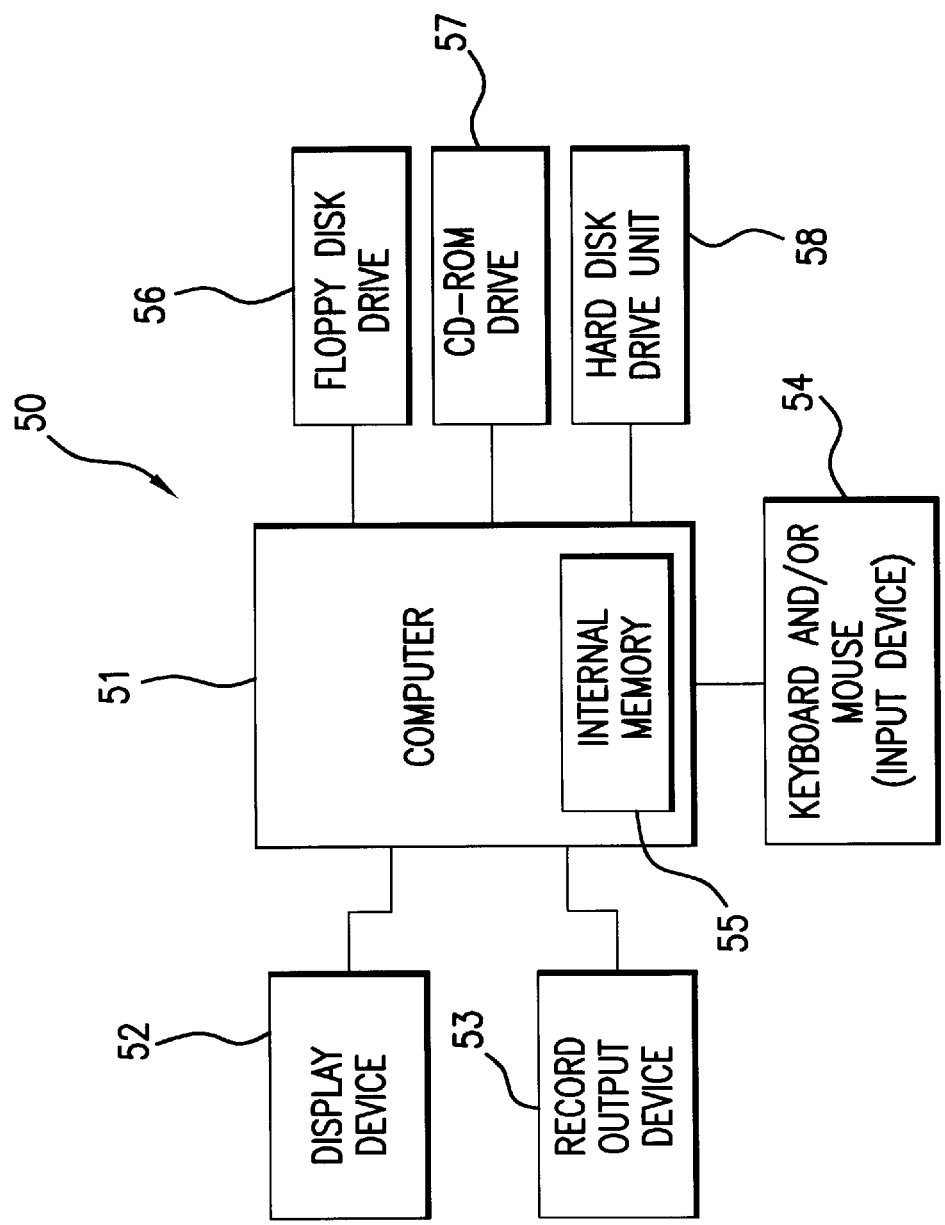
FIG. 13 is a block diagram of the computer system of FIG. 12.

FIG. 13 is a block diagram showing the above configuration. In addition to the computer main body 51, the chassis accommodates an internal memory 55 such as a RAM (random access memory), and an external memory such as a hard disk drive unit 58. As shown in FIG. 12, the video processing program that is, for example, recorded on a floppy disk 61 can be read out by using a proper application program when the floppy disk 61 is inserted in a slot. The recording medium on which a program is recorded is not limited to the floppy disk 61, and may be a CD-ROM 62. Other examples of the recording medium are MO (Magneto-Optical disk), an optical disk, and a DVD-ROM, all of which are not shown in FIG. 12.

The video processing program that is recorded on the recording medium and can be read out by a computer or the like is one obtained by writing, for instance, the steps of FIGS. 1,4,7,9 and 11 in a computer program format.

Further, although the present invention has been explained in the case of analyzing a digital video which is what a user has obtained automatically through recording or broadcasting to retrieve or play the digital video, the invention is also applicable to a case of creating a video title composed of a plurality of digital videos of the same category. In such a case, various retrieval/play control using the index can be realized by recording the index as shown in FIG. 6 on the same recording medium with the plurality of digital videos.

As described above, according to the present invention, a significant camera break may be automatically detected among a large number of camera breaks, and indexes can be created and various retrieval or play control processes may be performed by using the detected result.

It should be noted that the present invention should not exclusively be limited to a respective one of the illustrative embodiments and may be modified into various forms without departing from the spirit and scope of the invention.

What is claimed is:

1. A video processing system for determining a desired camera break in a video, comprising:

a detecting unit for detecting at least one camera break in the video; and an analyzing unit communicatively coupled to the detecting unit, wherein the analyzing unit analyzes a level of similarity between the detected camera break and a reference frame, the reference frame being extracted from another video belonging to a same category as the video that has the least one camera break detected by the detecting unit, and wherein the analyzing unit determines that the detected camera break is a desired camera break if the level of similarity is equal to or greater than a predetermined level.

2. The video processing system according to claim 1, wherein the video is a digital video.

3. The video processing system according to claim 1, wherein the predetermined level requires that the reference frame and the detected camera break be identical.

4. The video processing unit according to claim 1, wherein the detecting unit detects a plurality of successive camera breaks, wherein the analyzing unit analyzes a level of similarity between the plurality of detected successive camera breaks and a plurality of reference frames, and wherein the analyzing unit determines that the detected successive camera breaks are desired camera breaks if the level of similarity is equal to or greater than a predetermined level.

5. The video processing system according to claim 1, further comprising a recording unit for recording information concerning.

6. The video processing system according to claim 5, wherein the recorded information includes an index correspondence relationship between the desired camera break and the reference frame.

7. The video processing system according to claim 5, further comprising a processing unit for processing the video using.

8. The video processing system according to claim 7, wherein the processing unit retrieves the desired camera break from the video.

9. The video processing system according to claim 7, wherein the processing unit plays a section in the video, wherein the section includes the desired camera break.

10. The video processing unit according to claim 1, further comprising an other analyzing unit electrically connected to the recording unit, wherein the other analyzing unit analyzes a level of similarity between an other detected camera break and the desired camera break stored in the recording unit, and wherein the other analyzing unit determines that the other detected camera break is an other desired camera break if the level of similarity is equal to or greater than an other predetermined level.

11. The video processing system according to claim 10, wherein the predetermined level requires that the reference frame and the detected camera break be identical.

12. The video processing system according to claim 10, further comprising an other recording unit for recording information on the other desired camera break.

13. The video processing system according to claim 12, wherein the recorded information includes an index correspondence relationship between the desired camera break and the other desired camera break.

14. The video processing system according to claim 13, wherein the index correspondence relationship includes information on a frame number of the desired camera break and the other desired camera break.

15. The video processing unit according to claim 1, wherein the video processing system determines a desired camera break among a plurality of videos,
   wherein the detecting unit detects at least one camera break in each of the plurality of videos,
   wherein the analyzing unit determines a number of videos among the plurality of videos in which the detected camera break of one of the videos has a level of similarity to the other detected camera breaks of the other videos equal to or greater than a predetermined level, and
   wherein the analyzing unit determines that the detected camera break of the one video is a desired camera break if the number of videos is greater than a predetermined value.

16. A video processing method for determining a desired camera break in a video, comprising:
   detecting at least one camera break in the video;
   extracting a reference frame from another video in a same category as the video that has the at least one camera break being detected in the detecting step;
   analyzing a level of similarity between the detected camera break and the reference frame; and
   determining that the detected camera break is a desired camera break if the level of similarity is equal to or greater than a predetermined level.

17. The video processing method according to claim 15, wherein the video is a digital video.

18. The video processing method according to claim 16, wherein the predetermined level requires that the reference frame and the detected camera break be identical.

19. The method according to claim 16, wherein the detecting step detects a plurality of successive camera breaks,
   wherein the analyzing step analyzes a level of similarity between the plurality of detected successive camera breaks and a plurality of reference frames, and
   wherein the analyzing step determines that the detected successive camera breaks are desired camera breaks if the level of similarity is equal to or greater than a predetermined level.

20. The video processing method according to claim 16, further comprising a step of recording information concerning the desired camera break.

21. The video processing method according to claim 20, wherein the recorded information includes an index correspondence relationship between the desired camera break and the reference frame.

22. The video processing method according to claim 20, further comprising a step of processing the video using the recorded information.

23. The video processing method according to claim 22, wherein the processing step retrieves the desired camera break from the video.

24. The video processing method according to claim 22, wherein the processing step plays a section in the video, wherein the section includes the desired cameo break.

25. The video processing method according to claim 16, further comprising an other analyzing step that analyzes a level of similarity between an other detected camera break and the desired camera break stored by the recording step, and
   wherein the other analyzing step determines that the other detected camera break is an other desired camera break if the level of similarity is equal to or greater than an other predetermined level.

26. The video processing method according to claim 25, wherein the predetermined level requires that the reference frame and the detected camera break be identical.

27. The video processing method according to claim 25, wherein the video processing method determines a desired camera break among a plurality of videos,
   wherein the detecting step detects at least one camera break in each of the plurality of videos,
   wherein the analyzing step determines a number of videos among the plurality of videos in which the detected camera break of one of the videos has a level of similarity to the other detected camera breaks of the other videos equal to or greater than a predetermined level, and
   wherein the analyzing step determines that the detected camera break of the one video is a desired camera break if the number of videos is greater than a predetermined value.

28. The video processing method according to claim 25, further comprising an other recording step for recording information on the other desired camera break.

29. The video processing method according to claim 28, wherein the recorded information includes an index correspondence relationship between the desired camera break and the other desired camera break.

30. The video processing method according to claim 29, wherein the index correspondence relationship includes information on a frame number of the desired camera break and the other desired camera break.

31. A recording medium on which a video processing program is stored for determining a desired camera break in a video, the video processing program causing a computer to execute the steps of:
   detecting at least one camera break in the video;
   extracting a reference frame from another video in a same category as the video that has the at least one camera break being detected in the detecting step;
   analyzing a level of similarity between the detected camera break and the reference frame; and
   determining that the detected camera break is a desired camera break if the level of similarity is equal to or greater than a predetermined level.

32. The recording medium according to claim 31, wherein the video is a digital video.

33. The recording medium according to claim 31, wherein the predetermined level requires that the reference frame and the detected camera break be identical.

34. The method according to claim 31, wherein the detecting step detects a plurality of successive camera breaks,
   wherein the analyzing step analyzes a level of similarity between the plurality of detected successive camera breaks and a plurality of reference frames, and
   wherein the analyzing step determines that the detected successive camera breaks are desired camera breaks if the level of similarity is equal to or greater than a predetermined level.

35. The recording medium according to claim 31, wherein the video processing program further causes the computer to execute a step for recording information concerning the desired camera break.

36. The recording medium according to claim 35, wherein the recorded information includes an index correspondence relationship between the desired camera break and the reference frame.

37. The recording medium according to claim 31, further comprising a step of processing the video using the recorded information.

38. The recording medium according to claim 37, wherein the processing step retrieves the desired camera break from the video.

39. The recording medium according to claim 38, wherein the processing step plays a section in the video, wherein the section includes the desired camera break.

40. The recording medium according to claim 31, wherein the video processing program further causes the computer to execute an other analyzing step that analyzes a level of similarity between an other detected camera break and the desired camera break stored by the recording step, and
   wherein the other analyzing step determines that the other detected camera break is an other desired camera break if the level of similarity is equal to or greater than another predetermined level.

41. The recording medium according to claim 40, wherein the predetermined level requires that the reference frame and the detected camera break be identical.

42. The video processing method according to claim 40, wherein the video processing method determines a desired camera break among a plurality of videos,
   wherein the detecting step detects at least one camera break in each of the plurality of videos,
   wherein the analyzing step determines a number of videos among the plurality of videos in which the detected camera break of one of the videos has a level of similarity to the other detected camera breaks of the other videos equal to or greater than a predetermined level, and
   wherein the analyzing step determines that the detected camera break of the one video is a desired camera break if the number of videos is greater than a predetermined value.

43. The recording medium according to claim 40, further comprising an other recording step for recording information on the other desired camera break.

44. The recording medium according to claim 43, wherein the recorded information includes an index correspondence relationship between the desired camera break and the other desired camera break.

45. The recording medium according to claim 44, wherein the index correspondence relationship includes information on a frame number of the desired camera break and the other desired camera break.

46. A video processing system for determining a desired camera break in a video, comprising:
   a detecting unit for detecting at least one camera break in the video; and
   an analyzing unit communicatively coupled to the detecting unit, wherein the analyzing unit analyzes a level of similarity between the detected camera break and a reference frame, the reference frame being extracted from another video belonging to a same category as the video that has the least one camera break detected by the detecting unit, and
   wherein the analyzing unit determines that the detected camera break is a desired camera break if the detected camera break and the reference frame are similar.

47. The video processing system according to claim 46, wherein the analyzing unit determines that the detected camera break is a desired camera break if the detected camera break and the reference frame are identical.

* * * * *